US007450728B2

(12) United States Patent
Aiso et al.

(10) Patent No.: US 7,450,728 B2
(45) Date of Patent: Nov. 11, 2008

(54) PARAMETER CONTROL METHOD AND PROGRAM THEREFOR, AND PARAMETER SETTING APPARATUS

(75) Inventors: Masaru Aiso, Hamamatsu (JP); Takamitsu Aoki, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 601 days.

(21) Appl. No.: 10/977,312

(22) Filed: Oct. 28, 2004

(65) Prior Publication Data

US 2005/0092163 A1 May 5, 2005

(30) Foreign Application Priority Data

Oct. 30, 2003 (JP) ............................ 2003-369848

(51) Int. Cl.
*H04B 1/00* (2006.01)

(52) U.S. Cl. ............................ 381/119; 84/625; 84/660

(58) Field of Classification Search ................ 381/119; 84/625, 660
See application file for complete search history.

(56) References Cited

U.S. PATENT DOCUMENTS

| | | | | |
|---|---|---|---|---|
| 4,306,114 | A * | 12/1981 | Callahan | 381/119 |
| 5,177,801 | A * | 1/1993 | Shoda et al. | 381/119 |
| 5,268,964 | A * | 12/1993 | Watts | 381/107 |
| 5,317,641 | A * | 5/1994 | Yasuda et al. | 381/119 |
| 5,394,477 | A * | 2/1995 | Zampini et al. | 381/119 |
| 5,757,941 | A * | 5/1998 | McMillen | 381/119 |
| 5,933,505 | A * | 8/1999 | Bargauan | 381/119 |
| 6,812,771 | B1 * | 11/2004 | Behel et al. | 327/359 |
| 2003/0233158 | A1 * | 12/2003 | Aiso et al. | 700/94 |
| 2004/0010331 | A1 * | 1/2004 | Terada et al. | 700/94 |
| 2004/0015252 | A1 * | 1/2004 | Aiso et al. | 700/94 |

(Continued)

FOREIGN PATENT DOCUMENTS

EP 1 077 549 A2 2/2001

(Continued)

OTHER PUBLICATIONS

Office Action issued via a Foreign Patent Office. Mar. 25, 2008. "Notice of Grounds of Rejection" See pp. 2 and 3 for art rejection.*

(Continued)

*Primary Examiner*—David S. Warren
(74) *Attorney, Agent, or Firm*—Morrison & Foerster LLP

(57) ABSTRACT

Non-linear functions to be used for automatically varying current values of parameters to be set, independently of each other, are prepared in corresponding relation to a plurality of parameter setting operator members, such as faders of a mixer. In response to an automatic setting instruction, such as a scene recall instruction, the current value of the parameter, to be set via each of the operator members, is caused to vary gradually toward a given target value with a characteristic based on a corresponding one of the non-linear functions. For example, the non-linear function is defined by a start offset for setting a delay in a start of the variation, and a fade time necessary for actually causing the parameter to vary up to the target value after the variation start. Processing of a predetermined type of event (e.g., GPI event) may be delayed to allow for a time delay that would result during execution of automatic setting processing of each parameter.

9 Claims, 6 Drawing Sheets

U.S. PATENT DOCUMENTS

| | | | | |
|---|---|---|---|---|
| 2004/0028247 | A1* | 2/2004 | Aiso et al. | 381/119 |
| 2004/0104703 | A1* | 6/2004 | Aiso et al. | 318/568.19 |
| 2004/0133291 | A1* | 7/2004 | Nakayama et al. | 700/94 |
| 2004/0172144 | A1* | 9/2004 | Suyama et al. | 700/52 |
| 2005/0025321 | A1* | 2/2005 | Ajamian | 381/119 |

FOREIGN PATENT DOCUMENTS

| | | |
|---|---|---|
| EP | 1 102 273 A2 | 5/2001 |
| JP | 1321490 | 12/1989 |

OTHER PUBLICATIONS

Magix: "Sequoia Product Features", Samplitude Website [Online], Aug. 5, 2003, retrieved from the Internet: http://web.archive.org/web/20030122132.

Simon Price: "Pro Tools Notes, fades", Sound on Sound, [Online], May 2002.

Musik Produktiv: "Recording & Synthesizer, USB Controller", Handbuch Fur Musiker 2002, 2002, p. 480.

Craig Anderton: "Magix Sequoia Review", EQ, Sep. 2003, Section "MIDI".

Digital Production Console DM 2000 Owner's Manual, Yamaha Corporation, pp. 157-163.

* cited by examiner

PARAMETER CONTROL METHOD AND PROGRAM THEREFOR, AND PARAMETER SETTING APPARATUS

BACKGROUND OF THE INVENTION

The present invention relates to parameter control methods and programs therefor and parameter setting apparatus which are suited for use in digital mixers.

Recent mixing systems are provided with a function of storing, in memory, parameter values set via faders, volume control operator members, etc., ON/OFF states of various buttons and other settings or setting states (scene data) of the mixing system and then reproducing the thus-stored settings through one-touch operation by the user; one example of such recent mixing systems is known from "DM2000 Instruction Manual", published by Yamaha Corporation in February, 2002, Pages 160-163. For example, parameters in the scene data may include, in addition to the operating states of the operator members, outputs of MIDI events, outputs of GPI (General-Purpose Interface) events, etc.

When scene recall instructing operation has been performed, parameter values of the individual operator members have to be displayed on an operation panel in automatically-reproducible form. Specific display form of the parameter value differs among the types of the operator members. For each of the faders, the parameter value is displayed by an operating position of the fader itself, thus, for automatic reproduction of the parameter values on the operation panel, it is necessary to provide a drive mechanism, such as a motor mechanism, to physically drive the faders.

Further, in the mixing systems, predetermined switches each have an LED built therein to display an operating state of the switch by an ON/OFF state of the LED. The operating state of the switch can be reproduced by automatically turning on/off the LED in accordance with a memory-stored setting. Generally, for each of the volume control members, a plurality of LEDs are disposed circularly around the volume control member, so as to indicate the parameter value of the volume control member by respective illuminating states of these circularly-disposed LEDs. According to the disclosure of the above-mentioned "DM2000 Instruction Manual", a time length necessary for an operator member, such as a fader, to reach an operating position corresponding to a target value after a user's scene data recall instruction is referred to as "fade time", and a human operator or user is allowed to set a desired fade time for each of the operator members.

With the above-discussed technique, however, driving etc. of all the operator members are started at once in response to a scene recall instruction, and it is impossible to instruct, by single scene data, a particular process, e.g. where a plurality of faders are caused to fade in sequentially at predetermined time intervals. Therefore, when such a particular process is required, it is necessary to create a plurality of scene data for causing the plurality of faders to fade in individually and then sequentially recall these scene data as necessary. However, if such a recall process is expressed by a plurality of scene data as noted above, the number of scenes would increase greatly, so that management of the scene data would be unavoidably complicated and a scene memory of a great capacity would be required.

SUMMARY OF THE INVENTION

In view of the foregoing, it is an object of the present invention to provide a parameter control method and program therefor and parameter setting apparatus which can express complicated variation of parameters with one scene data.

In order to accomplish the above-mentioned object, the present invention provides a parameter control method, which comprises: a first step of preparing non-linear functions to be used for automatically varying current values of parameters to be set, independently of each other, in corresponding relation to a plurality of parameter setting operator members; a second step of detecting when an automatic setting instruction has been given for instructing that the parameter, to be set via each of the operator members, should be automatically set at a given target value; and a third step of, in response to detection of the automatic setting instruction and for each of the operator members, gradually varying the current value of the parameter, to be set via the operator member, toward the given target value with a characteristic based on a corresponding one of the non-linear functions.

In response to detection of the automatic setting instruction and for each of the parameter setting operator members, the current value of the parameter, to be set via the operator member, is caused to gradually vary with a characteristic based on the corresponding non-linear function. Thus, according to the present invention, the parameter setting states of the individual operator members can be caused to vary, in response to one automatic setting instruction, individually in a diversified and complicated manner with different characteristics based on the corresponding non-linear functions, rather than varying uniformly. Further, because such diversified and complicated variation of the parameter setting states can be accomplished by merely preparing appropriate non-linear functions and performing control in accordance with the prepared non-linear functions, the present invention can significantly simplify the necessary arrangements.

As an example, the present invention can be applied to a scene recall function of an audio mixer. In such a case, the above-mentioned operator member corresponds to any one of a plurality of operator members in the audio mixer, the above-mentioned automatic setting instruction corresponds to a scene recall instruction, and the above-mentioned given target value corresponds to target value data for any one of the operator members read out from a scene memory in association with the operator member. With such application, the set parameter of each of the operator members (various parameters) can be varied in a diversified and complicated manner during a period from the start to end (completion) of scene recall processing in the audio mixer, which can create variation of the parameters in dramatic form, as desired by the user, during scene recall processing.

According to another aspect of the present invention, there is provided a parameter control which further comprises: a step of accepting an event of a predetermined type; a step of setting a start delay time for delaying a start of processing of the event; a step of measuring an elapsed time after detection of the automatic setting instruction; and a step of comparing the start delay time and the elapsed time and performing control to start processing of the accepted event on condition that the start delay time has passed after the detection of the automatic setting instruction. Thus, when it is necessary to start processing of a particular event while the automatic parameter setting processing of each of the operators is being performed in response to the automatic setting instruction, initiation of the processing of the particular event can be delayed by the start delay time set for that particular event. Therefore, processing of a predetermined type of event (e.g., GPI event) may be delayed to allow for a time delay that would result during execution of automatic setting processing of each parameter, which permits event processing well-harmonized with the automatic parameter setting processing.

The present invention may be constructed and implemented not only as the method invention as discussed above but also as an apparatus invention. Also, the present invention may be arranged and implemented as a software program for execution by a processor such as a computer or DSP, as well as a storage medium storing such a software program. Further, the processor used in the present invention may comprise a dedicated processor with dedicated logic built in hardware, not to mention a computer or other general-purpose type processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the objects and other features of the present invention, its preferred embodiments will be described hereinbelow in greater detail with reference to the accompanying drawings, in which.

DETAILED DESCRIPTION OF THE EMBODIMENTS

Figure 1:
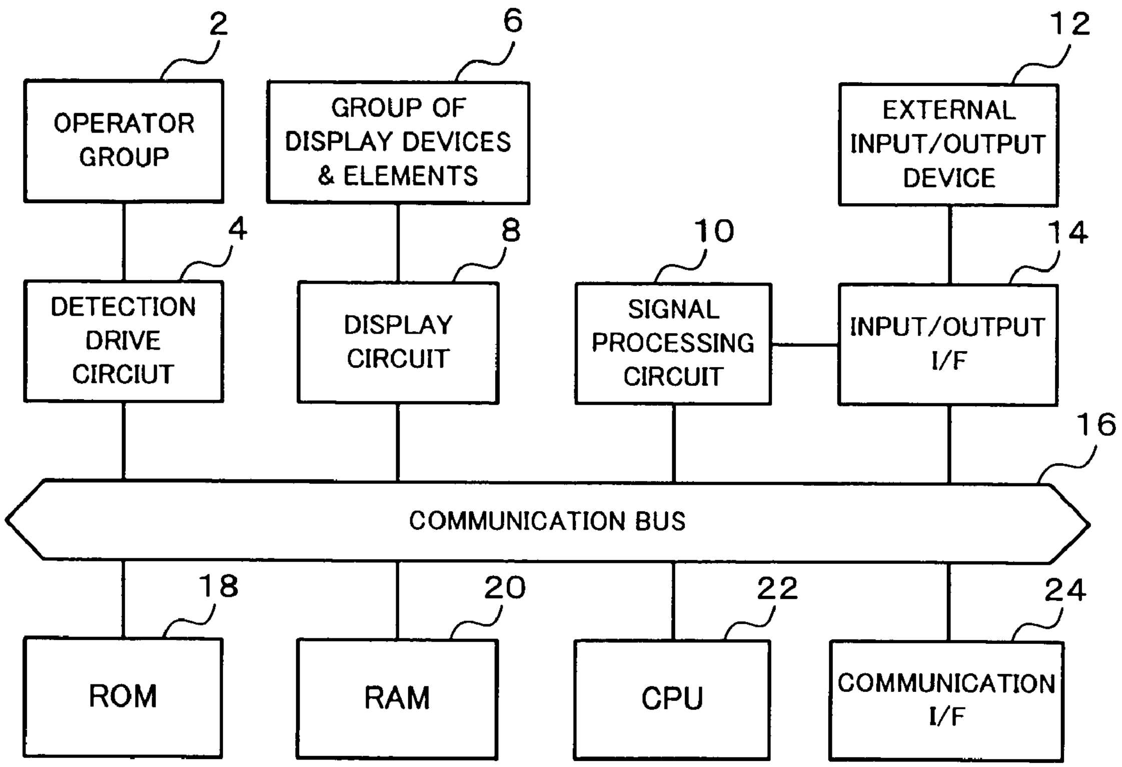
FIG. 1 is a block diagram showing a general hardware setup of a digital mixer in accordance with an embodiment of the present invention

1. Hardware Setup:

1.1. General Hardware Setup:

With reference to FIG. 1, a description will be given about a general hardware setup of a digital mixer in accordance with an embodiment of the present invention.

The digital mixer of FIG. 1 includes a group of operators (operator members) 2 that includes faders, volume control operator members, switches, a mouse, a keyboard, etc. The digital mixer also includes a detection/drive circuit 4 detects operation events of the operator members 2 and outputs data indicative of the detected operation events via a communication bus 16, and the detection/drive circuit 4 also drives the faders via a motor mechanism. The digital mixer further includes a group of display devices and elements 6, which include LEDs built in the switches, LEDs provided around each of the volume control operator members, small-size display elements for displaying channel names etc., and an LCD (Liquid Crystal Display) having a great-size screen. Display circuit 8 controls display states of these display devices and elements 6 on the basis of display commands supplied via the communication bus 16.

Further, in the digital mixer, an input/output interface 14 inputs and outputs analog or digital audio signals from and to an external input/output device 12. Signal processing circuit 10 comprises a group of DSPs (Digital Signal Processors). The signal processing circuit 10 performs mixing processing and effect processing on the digital audio signals supplied via the input/output interface 14, and it outputs the processed results to the input/output interface 14. Reference numeral 22 represents a CPU that controls various components of the digital mixer, via the communication bus 16, on the basis of control programs stored in a ROM 18. RAM 20 is used as a working memory for the CPU 22 and also stores scene data as will be later described. Communication interface 24 inputs and outputs MIDI signals, control signals, etc. from and to the external input/output device 12.

Figure 2:
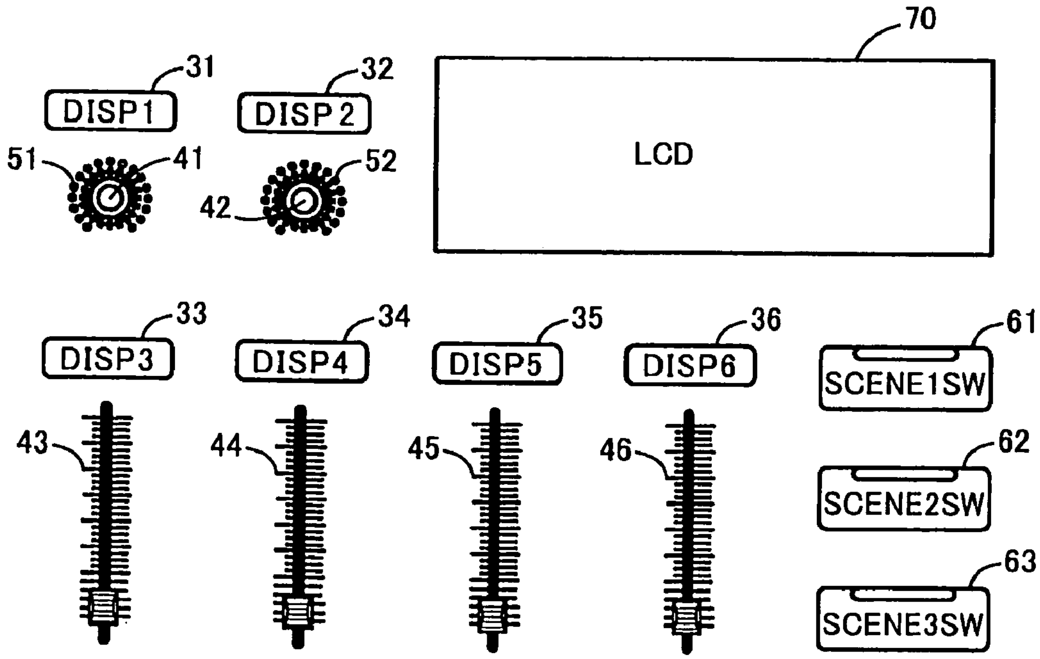
FIG. 2 is a plan view showing an example structure of a principal section of an operation panel employed in the digital mixer.

1.2. Structure of Operation Panel:

FIG. 2 shows an example structure of a principal section of an operation panel employed in the digital mixer, where reference numerals 43, 44, 45 and 46 represent electric faders for setting attenuation levels of four input channels. The electric faders 43-46 are not only manually operable by the user (human operator) but also automatically controllable under control of the CPU 22. Rotary encoders 41 and 42 are used to set respective attenuation levels of left and right output channels. Reference numerals 51 and 52 represent two groups of level indicating LEDs surrounding the rotary encoders 41 and 42; each of the groups is composed, for example, of dozens of level indicating LEDs. These level indicating LEDs are disposed around the corresponding rotary encoder 41 or 42 in a substantial annular or circular configuration with no LED provided along a lower end portion of the rotary encoder. Illumination state of the level indicating LEDs indicates a current operating position of the corresponding rotary encoder 41 or 42. Namely, if a particular parameter to be displayed is of a minimum value, only the level indicating LED located at a lower left end of the group is illuminated. Each time the parameter value increases by a predetermined increment (resolution width), the next level indicating LED, located to the right of the last-illuminated level indicating LED, is illuminated. Once the parameter reaches a maximum value, the last LED in the group is illuminated so that all of the level indicating LEDs are now in the illuminated (turned-on) state.

Reference numerals 31 to 36 represent channel display elements which are provided immediately above the rotary encoders 41, 42 and electric faders 43 to 46 in corresponding relation thereto. The channel display elements 31 to 36 display information of input/output channels corresponding to the electric faders 43 to 46 etc. For example, the information displayed on the channel display elements 31 to 36 includes "channel numbers" or "channel names" of the corresponding input/output channels. The user can designate any desired information that should be displayed on the channel display elements 31 to 36.

In the digital mixer of FIG. 1, scene data of a total of three scenes (i.e., first, second and third scenes) can be stored in the RAM 20. Scene switches 61, 62 and 63 are provided for storing and recalling the first, second and third scenes, respectively. Each of the scene switches 61, 62 and 63 operates as a scene recalling switch, when it is merely depressed alone. However, each of the scene switches 61, 62 and 63 operates as a switch for storing, in the RAM 20, stored contents of current buffers, indicative of current conditions of the digital mixer, as corresponding scene data, when the scene switch is operated in a predetermined manner, e.g. by being depressed concurrently with a special key. The LCD display device 70 includes a dot-matrix display structure comprising hundreds (or thousands) of dots in each of the row and column directions, which displays various information, images, etc. under control of the CPU 22.

1.3. Example of Display on the LCD Display Device 70:

Images to be displayed on the LCD display device 70 can be selected by the user. For example, when a specific parameter, such as a frequency characteristic, is to be set in detail for any one of the input/output channels, a screen, via which the parameter can be shown and edited, are displayed on the LCD display device 70. On the LCD display device 70, there can also be displayed a "recall characteristic setting screen" (FIG. 4) for setting a "fade time" and "start offset" for each channel. Details of the "fade time" and "start offset" will be explained below with reference to FIG. 5.

Figure 5:
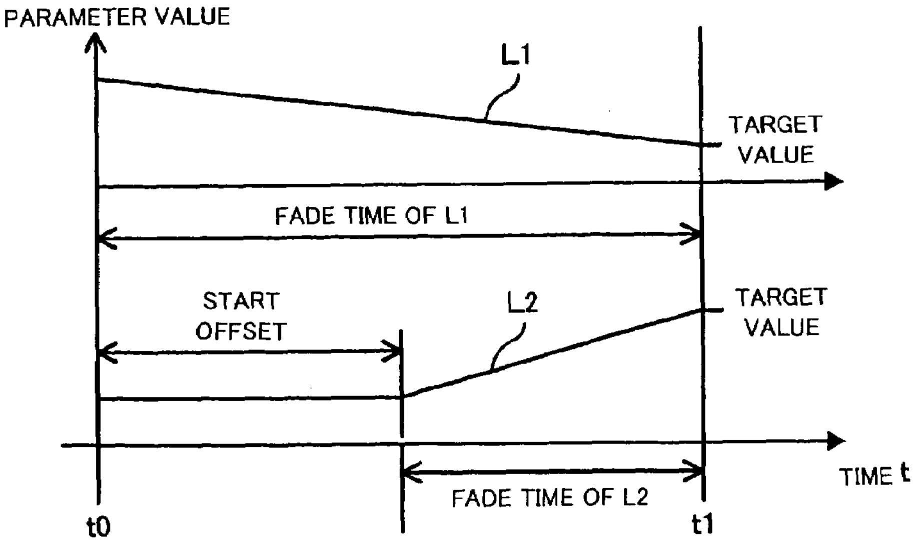
FIG. 5 is a diagram explanatory of behavior of the embodiment.

Let it be assumed that scene recall instructing operation has been performed by the user at time point t0 in the illustrated example of FIG. 5. In the instant embodiment, the "fade time" means a time defining a length of a fade section for which a parameter continues to be varied to reach a target value after an actual start of the variation in value of the parameter. Here, if no start offset has been set, the variation in value of the parameter is started immediately in response to the user's scene recall instructing operation, and the parameter value will vary linearly until the fade time expires, as depicted by characteristic "L1" in FIG. 5.

The "start offset" means a time defining a length of a retention section for which, in response to user's scene recall instructing operation, a parameter value immediately before the scene recall instructing operation is retained; the "start offset" is also referred to as "start delay time". If scene recall instructing operation is performed by the user with the start offset or start delay time set in advance, the parameter value immediately before the scene recall instructing operation is retained from the time of the scene recall instructing operation till lapse of the start offset and then linearly varies until the fade time expires, as indicated by "L2" in FIG. 5.

Details of the recall-characteristic setting screen will be described with reference to FIG. 4. In the figure, reference numeral 111 represents a fade-time setting section for the first input channel, and a currently-set fade time ("60" seconds in the illustrated example) is displayed at a middle portion of the fade-time setting section. Increment and decrement buttons 111*a* and 111*b* are provided at opposite, left and right, ends of the fade-time setting section 111. The user can change the fade time by clicking on the middle portion of the fade-time setting section 111 and then entering a desired fade time value via a keyboard. The fade time value can also be increased or decreased by clicking on one of the increment and decrement buttons 111*a* and 111*b*.

Similar fade-time setting sections 112-116 are provided in corresponding relation to the second to forth input channels (CH2-CH4) and left and right output channels (ST1 and ST2). Reference numerals 121-128 represent start-offset setting sections, which can be used to set start offsets for the corresponding channels in a similar manner to the fade-time setting sections 111-116. In the illustrated example, "10" seconds is set for each of the channels CH1, CH2 and GPI. Here, the start-offset setting sections 127 and 128 are provided for setting start offsets of a MIDI event (music performance event) and GPI (i.e., General Purpose Interface) event (remote control event of a switch or relay operating on external equipment), respectively. Because the concept of "fade time" is not applicable to these MIDI and GPI events that are executed instantaneously at predetermined timing, there is provided no fade-time setting section corresponding to the start-offset setting sections 127-128. Mark "-" is displayed in some of the start-offset setting sections 121-128, which indicates that no start offset is set for the corresponding channel.

Figure 3:
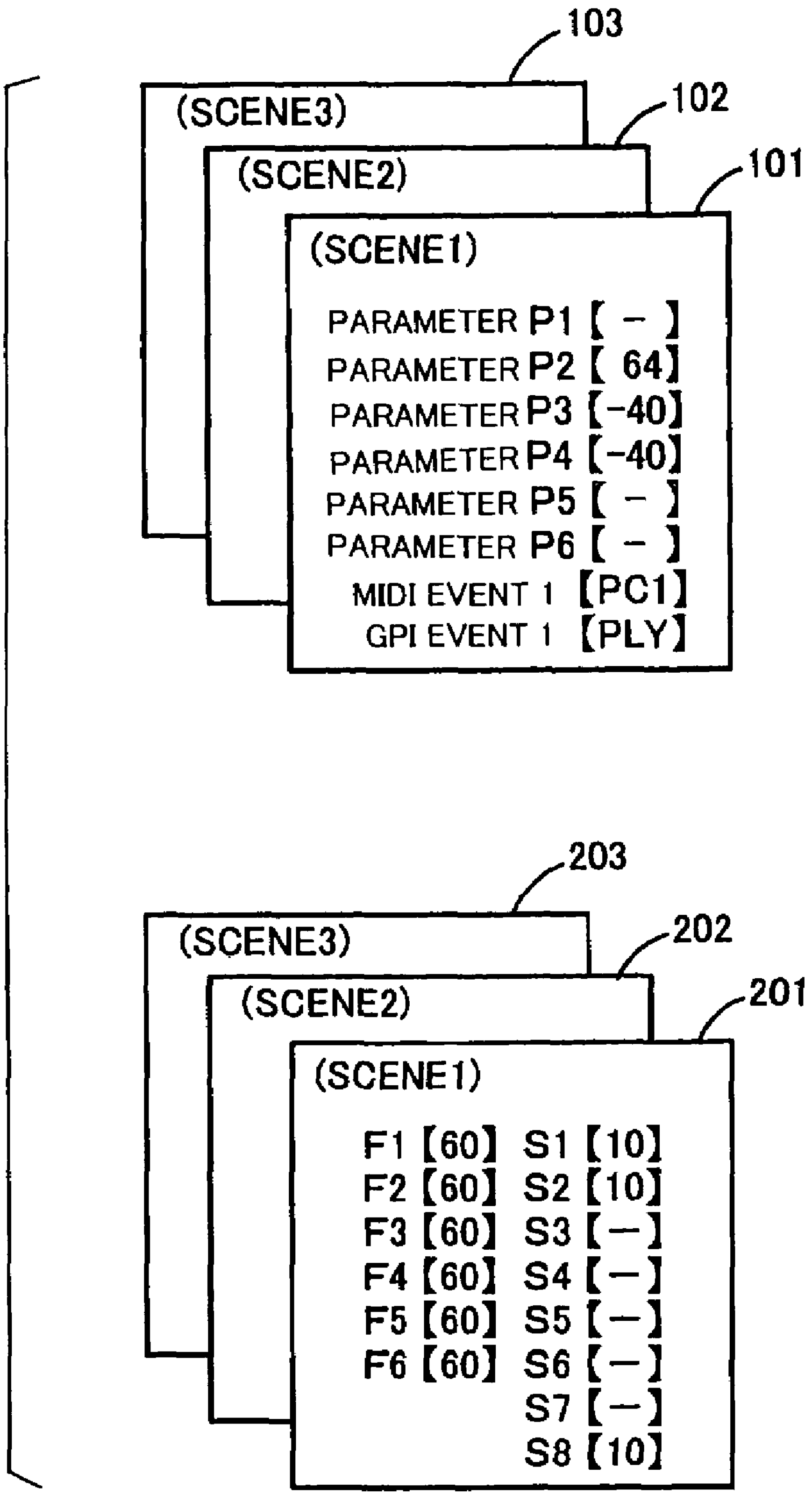
FIG. 3 is a diagram explanatory of structures of scene data and recall characteristic data.

1.4. Data Structure:

Structures of scene data etc. recorded in the RAM 20 will be explained with reference to FIG. 3. In the figure, reference numerals 101, 102 and 103 represent sets of scene data provided in corresponding relation to the first, second and third scenes. In the scene data set 101, respective target values are stored for a plurality of parameters P1-P6. These target values indicate respective target attenuation levels of the left and right output channels and four input channels.

The parameters "MIDI event 1" and "GPI event 1" are parameters that respectively define a MIDI event and GPI event output in response to a scene recall instruction. In the illustrated example, "PC1 (program change)" is defined as "MIDI event 1", and "PLY" (play or reproduction start) is defined as "GPI event 1". Also, in the illustrated example, the parameters, for which only a "-" mark is stored, are parameters not intended for scene recall (i.e., not set as objects of scene recall). The other scene data sets 102 and 103 are constructed in a similar manner to the above-described scene data set 101.

Further, reference numerals 201, 202 and 203 represent sets of recall characteristic data, which are stored in the RAM 20 in association with the scene data sets 101, 102 and 103. In the recall characteristic data set 201, reference characters F1-F6 represent fade time buffers corresponding to the parameters P1-P6, and reference characters S1-S8 represent start offset buffers corresponding to the parameters P1-P6, "MIDI event 1" and "GPI event 1". These buffers are provided for storing fade times and start offsets of the individual input/output channels having been set via the recall characteristic setting screen of FIG. 4. The other recall characteristic data sets 202 and 203 are constructed in a similar manner to the above-described recall characteristic data set 201.

Further, in the RAM 20, there are provided current buffers C1-C6 and retention buffers B1-B6, in addition to the areas for storing the scene data and recall characteristic data. The retention buffers B1-B6 are buffers for storing individual parameters of recalled scene data. The current buffers C1-C6 are buffers for storing respective current attenuation levels of the left and right output channels and four input channels.

2. Behavior of the Embodiment:

The following paragraphs describe behavior of the instant embodiment.

Figure 6:
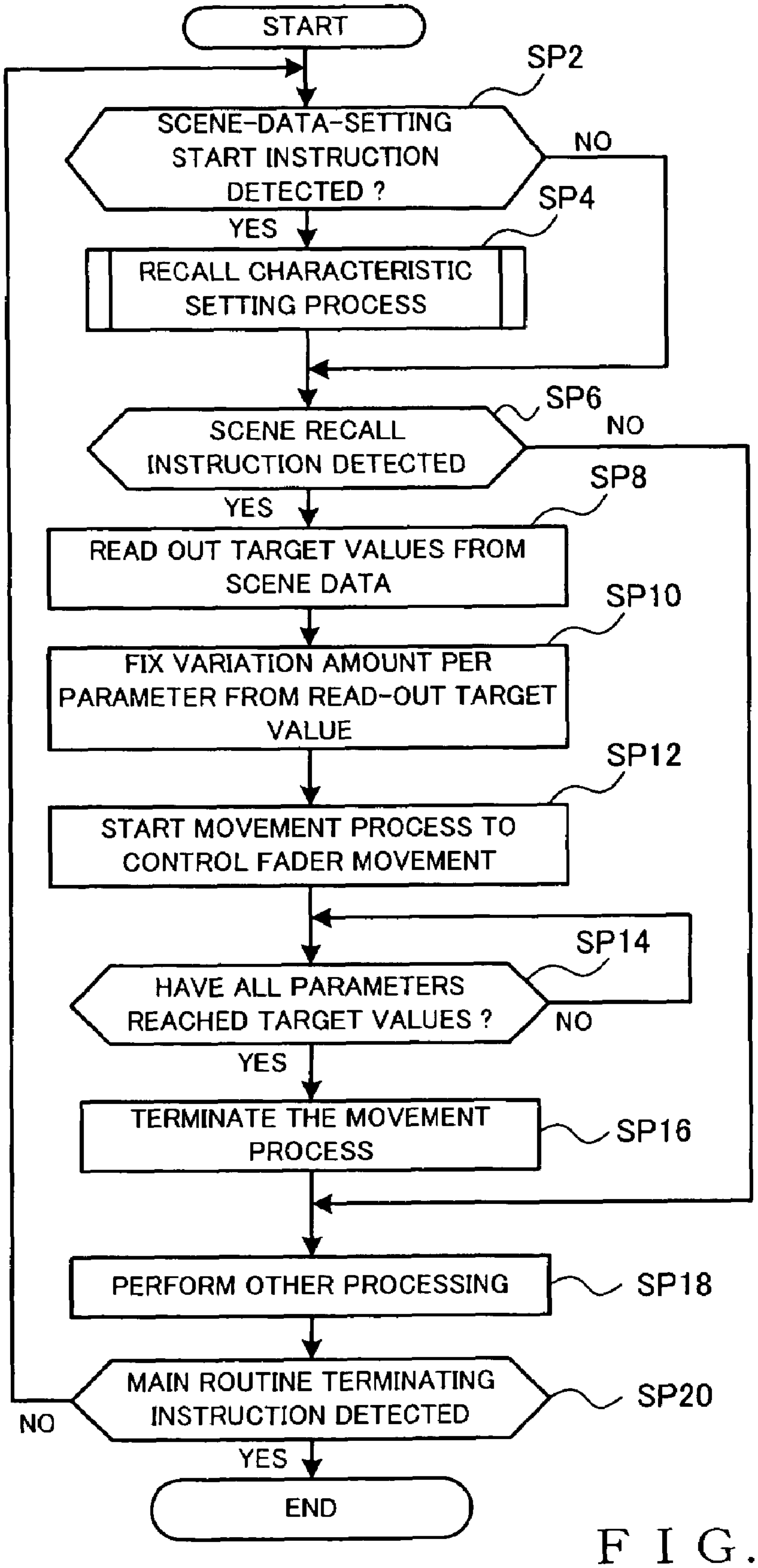
FIG. 6 is a flow chart of a main routine performed in the embodiment.

Upon turning-on of the instant embodiment of the digital mixer, a main routine illustrated in FIG. 6 is started up. At step SP2, a determination is made as to whether user's predetermined operation for setting a recall characteristic of the scene data via the operator group 2 has been detected. Such recall-characteristic setting operation necessarily involves designation of a scene to be recalled; for example, the recall-characteristic setting operation is performed by simultaneously depressing the special key for instructing setting of a desired recall characteristic and any one of the scene switches 61, 62 and 63 as noted above. If a "YES" determination is made at step SP2, the routine proceeds to step SP4, where a subroutine of a recall characteristic setting process as illustrated in FIG. 7 is called.

Figure 7:
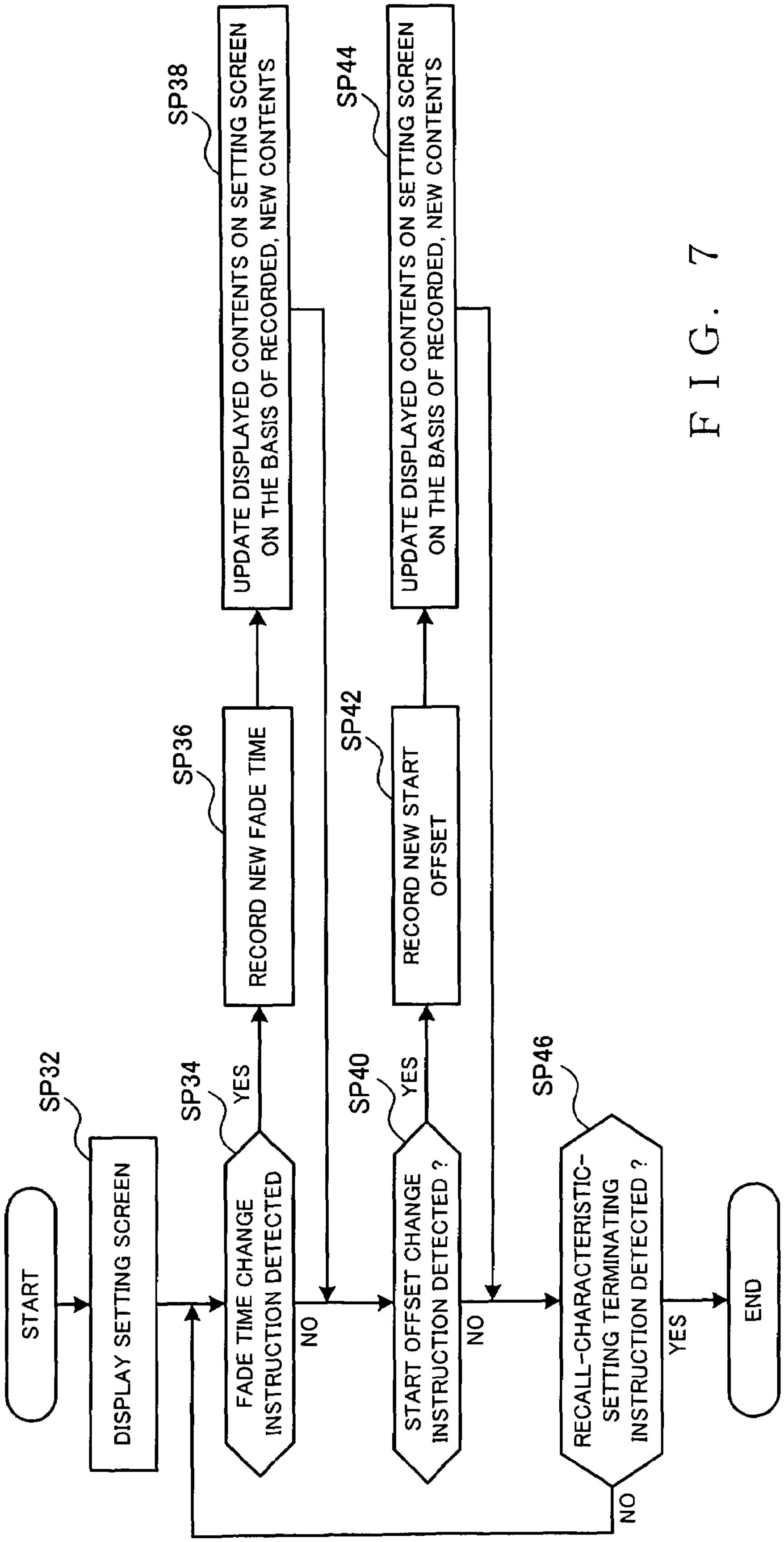
FIG. 7 is a flow chart of a recall-characteristic setting process performed in the embodiment.

At step SP32 of FIG. 7, one of the recall characteristic data sets 201, 202 and 203, which corresponds to the scene to be recalled, is read out. Then, the recall-characteristic setting screen (see FIG. 4), reflecting therein the contents of the fade time buffers F1-F6 and start offset buffers S1-S8 included in the read-out recall characteristic data set, is displayed on the LCD display device 70. At step SP34, a determination is made as to whether a user's instruction for changing a fade time, i.e. user's entry of a numerical value or operation of the increment or decrement button 111*a* or 111*b*, via any one of the fade-time setting sections 111-116 has been detected.

With a "YES" determination at step SP34, the subroutine goes to step SP36, where a fade time newly designated by the detected operation is stored in a corresponding one of the fade time buffers F1-F6. At next step SP38, a corresponding display on the corresponding fade-time setting section 111-116 is updated so as to reflect the new fade time recorded in the fade time buffer.

Then, at steps SP40-SP44, operations similar to those of steps SP34-SP38 are carried out for setting of a start offset. Namely, once a user's instruction for changing a start offset is given via any one of the start offset setting sections 121-128, the contents of one of the start offset buffers S1-S8, corresponding to the one start offset setting section 121-128, are updated, and a corresponding display on the corresponding start offset setting section 121-128 is updated so as to reflect the updated contents. Then, the subroutine goes to step SP46, where it is determined whether or not predetermined operation for terminating the recall characteristic setting process has been performed. If a "NO" determination has been made at step SP46, the operations at and after step S34 are repeated, while, If a "YES" determination has been made, the subroutine is brought to an end.

Referring back to FIG. 6, a determination is made at step SP6 whether or not a scene data recall instruction (i.e., instruction for selecting one of the scene data sets, reading out target values of individual signal control parameters from the selected scene data set, and automatically setting the individual signal control parameters at the read-out target values) has been detected or not. Specifically, at step SP6, it is determined whether a depression event of only any one of the scene switches 61, 62 and 63 has been depressed. With a "NO" determination at step SP6, the routine jumps to step SP18, where other processing than scene recall processing is carried out as will be later detailed. If, on the other hand, a "YES" determination is made at step SP6, the routine goes to step SP8, where the respective target values of the parameters P1-P6 are read out and stored in the corresponding retention buffers B1-B6.

At following step SP10, variation amounts for the individual parameters are determined or fixed on the basis of the read-out target values, as detailed below. As noted earlier, a given fade time is preset for each of the parameters P1-P6 in the recalled scene data set. During the fade time period, a later-described timer interrupt process is carried out every predetermined time, and the parameter in question gradually approaches the target value each time a timer interrupt signal is generated.

At step SP10, the parameter variation amounts for the parameters per timer interrupt are fixed. For example, if the fade time is "60" seconds and the timer interrupt interval is 10 msec., "6,000" timer interrupt signals will be generated during the fade time. In this case, the parameter variation amount per timer interrupt signal can be calculated by "(target value–parameter value immediately before the recall instruction)/6,000". Regarding each of the parameters for which a start offset is set, a zero (0) variation amount is always set at step S10.

At following step SP12, a movement process is carried out for updating the parameters in response to the timer interrupt signals, moving the electric faders and illuminating/deilluminating the LED groups 51 and 52. This movement process will be later described in greater detail. At next step SP14, a determination is made as to whether the current values of all the parameters have reached the respective target values, namely, whether the stored values of the current buffers C1-C6 have all equaled or agreed with the stored values of the retention buffers B1-B6. With a "NO" determination at step SP14, the operation of step SP14 is repeated until a "YES" determination is made.

Figure 8:
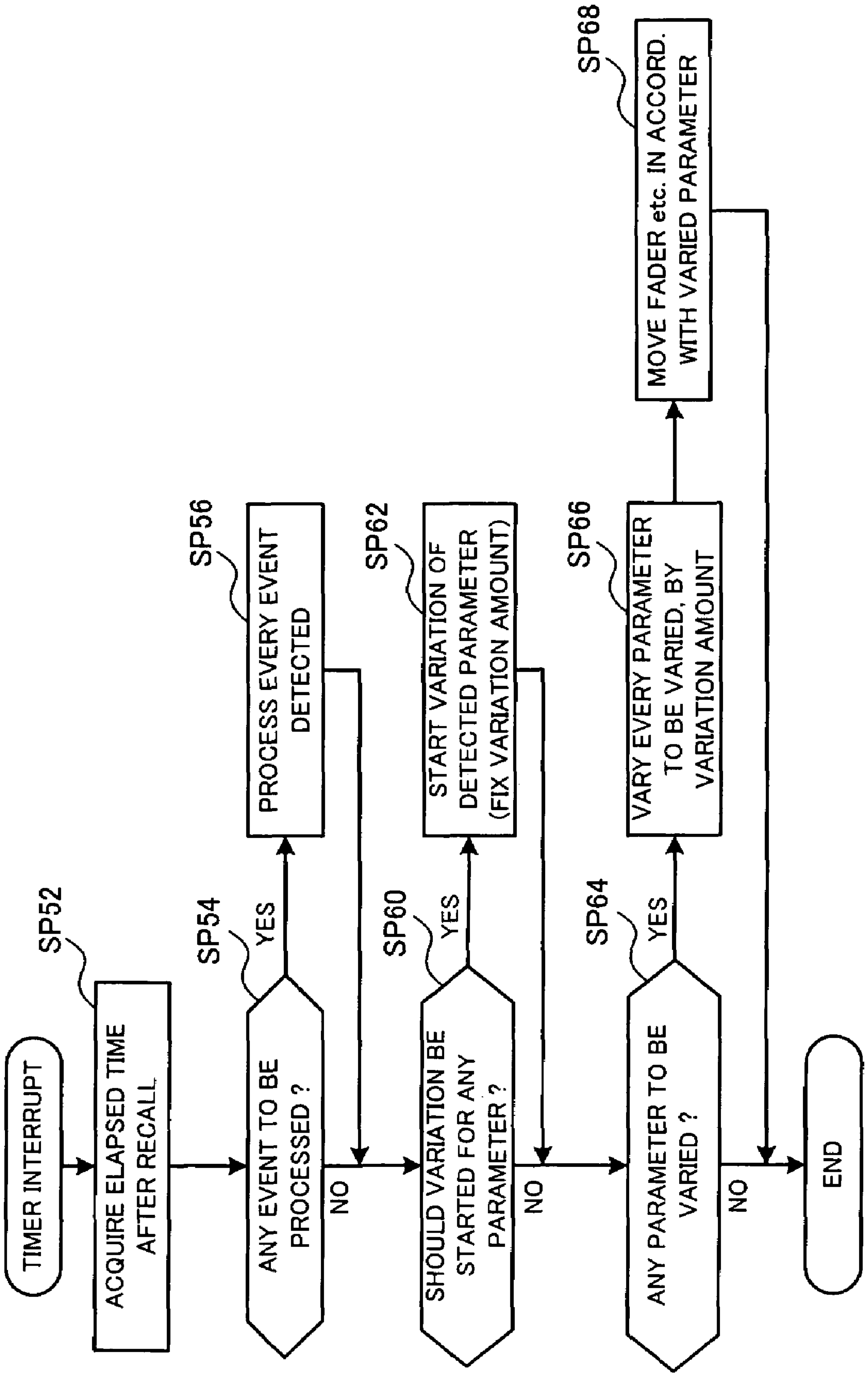
FIG. 8 is a flow chart of a timer interrupt routine performed in the embodiment.

Here, the movement process started at step SP12 is explained. In the movement process, the timer interrupt signal is generated every predetermined time (e.g., 10 msec.), in response to which a timer interrupt routine of FIG. 8 is executed. At step SP 52 of FIG. 8, a time having elapsed after the latest scene recall instruction is calculated on the basis of the number of execution of the timer interrupt routine after the latest scene recall instruction.

At step SP54, it is determined whether there is any event to be processed at the current timer interrupt timing. Here, if the detected event is to be carried out in the digital mixer, "processing an event" means "carrying out the event within the digital mixer". Further, if the detected event is to be carried out by an external device, "processing an event" means "transmitting a corresponding control signal to the external device".

In the instant embodiment, the "event" is either a MIDI event (i.e., music performance event) or GPI event. Further, the "event to be processed at the current interrupt timing" means an event having a start offset equal to the current elapsed time, or an event remaining to be carried out although its start offset is shorter than the current elapsed time. Here, each event for which no start offset is set is regarded as having a "zero (0)" start offset.

Therefore, the above-mentioned event will be carried out when the timer interrupt routine of FIG. 8 is started up for the first time after the scene recall instruction. In the illustrated example of FIG. 4, no start offset is set for the MIDI event. Therefore, the MIDI event is determined as an "event to be processed at the current interrupt timing" when the time interrupt routine is executed for the first time, and the routine proceeds to step S56, where every detected event is processed.

Namely, in response to the first timer interrupt, the "PC1 (program change)" of the MIDI event is carried out. Specifically, a program change of a MIDI signal is output to an external MIDI device or the like via the communication interface 24. Further, in the illustrated example of FIG. 4, where a "10 sec." start offset is set for the GPI event, the GPI event is processed in response to the "1,000$^{th}$" timer interrupt signal. Specifically, a control signal instructing a "reproduction start" is transmitted to an external sound reproduction device or the like. Namely, at step SP54, a determination is made as to whether there is any event to be currently processed, and, if there is a GPI event to be currently processed, a further determination is made, on the basis of the elapsed time after the scene recall instruction, as to whether or not the start offset time of the GPI event has elapsed or passed. Thus, if a GPI event has occurred after the scene recall instruction, processing of the GPI event is delayed by the start offset time.

At step SP60, it is determined, on the basis of the elapsed time after scene recall instruction, whether variation should be started for any of the parameters P1-P6. Namely, a determination is made as to whether, of the parameters P1-P6, there is any parameter which has a start offset equal to the current elapsed time or for which no variation amount has been set yet although its start offset is shorter than the current elapsed time. In this case too, each parameter for which no start offset is set is regarded as having a "zero (0)" start offset. However, because variation amounts have already been fixed for these parameters at step SP10, a "NO" determination is made at step SP6 in the illustrated example of FIG. 4, so that operations at and after step S64 will be carried out.

Figure 4:
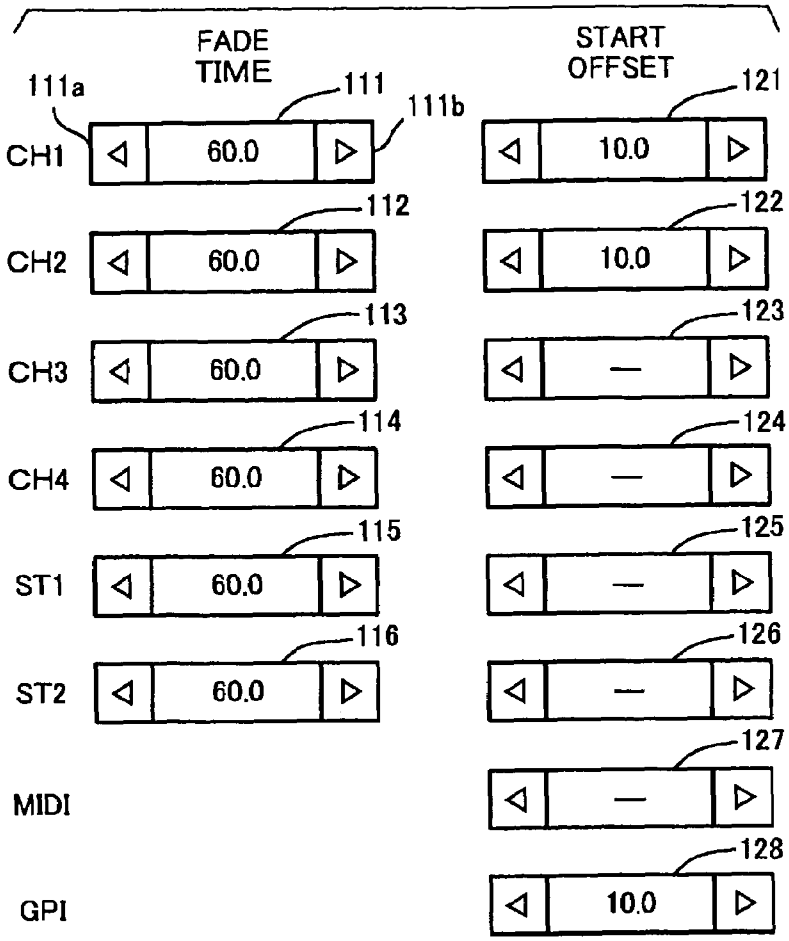
FIG. 4 is a diagram showing example displays on an LCD display device of the digital mixer.

In the illustrated example of FIG. 4, a "10" sec. start offset is set for the first and second input channels, a "YES" determination is made at step SP60 in response to the "1,000$^{th}$" timer interrupt signal, so that the routine goes to step SP62. At step SP62, variation is started for every parameter that has been detected as a parameter that should now start varying. Specifically, if the fade time is "60 sec.", "(target value−parameter value immediately before the recall instruction)/6,000" is set here as a variation amount for that parameter, as at step SP10.

At next step SP64, a determination is made as to whether there is any parameter to be varied in value. Namely, a comparison is made between the stored contents of the retention buffers B1-B6 and the stored contents of the current buffers C1-C6, so as to determine whether conditions that "there is any parameter for which the compared stored contents do not agree with each other" and that "a variation amount has been set for that parameter". If agreement between the compared stored contents has been confirmed for all of the parameters, or if no variation amount has been set for any of the parameters for which the compared stored contents do not agree with each other, a "NO" determination is made at step SP64, upon which the routine is immediately brought to an end.

If a "YES" determination is made at step SP64, the routine goes to step SP66. Here, of the parameters stored in the current buffers C1-C6, the corresponding variation amount is added to each parameter to be varied in value. Each parameter having been thus varied in value is immediately set into a register of the signal processing circuit 10, so that the level etc. of an actual audio signal are controlled in accordance with the varied parameter.

At following step SP68, the electric fader for each of the input channels related to all the parameters to be varied is moved to a position corresponding to the varied parameter (attenuation level). Further, for each of the output channels, the illumination/deillumination state of the level-indicating LEDs is varied. Through repetition of the above operations per timer interrupt, the positions of the electric faders and the illumination/deillumination states of the level-indicating LEDs are varied gradually. Further, for each parameter whose start offset has elapsed, the stored contents of the current buffer C1-C6 gradually approach the stored contents of the retention buffers B1-B6. When the fade times of all the parameters have elapsed or expired, the stored contents of the current buffer C1-C6 and the retention buffers B1-B6 agree with each other for all of the parameters.

Referring back to step SP14, a "YES" determination is made when the stored contents of the current buffer C1-C6 and the retention buffers B1-B6 have agreed with each other, after which the routine goes to step SP18 in order to carry out various other operations than the above operations pertaining to the scene recall. For example, once the user operates any one of the electric faders 43-46, rotary encoders 41, 42, etc., the operation event is detected, and the stored contents of the current buffer C1-C6 are updated in accordance with a current operating position of the operated operator member.

Then, the updated contents of the current buffer C1-C6 are set as parameters to be given to the signal processing circuit 10, so that the attenuation levels etc. of audio signals are controlled in accordance with the parameters. If an image of the operated electric fader, rotary encoder or the like has so far been displayed on the LCD display device 70, the images are also updated. After that, the routine proceeds to step SP20, where a determination is made as to whether an instruction for terminating the main routine of FIG. 6 has been given or not. With a "NO" determination, the operations at and after step SP2 are repeated, while, with a "YES" determination, the main routine is brought to an end.

3. Modification:

The present invention may be modified variously as follows without being limited to the above-described embodiment.

(1) The above-described embodiment is arranged to display parameters by the CPU 22 etc. of the digital mixer executing various programs. The programs alone may be stored on a storage medium, such as a CD-ROM or flexible disk, for distribution via the storage medium, or may be distributed via transmission paths.

(2) In the above-described embodiment, the total time length necessary for a particular parameter to reach a target value after a scene recall instructing operation is equal to a sum "start offset+fade time". Alternatively, the total time length necessary for a particular parameter to reach a target value after a scene recall instructing operation may be set as a "fade time", and a time length over which the parameter actually varies may be set to equal a difference "fade time−start offset".

(3) On the recall-characteristic setting screen (FIG. 4), the display style of the fade time may be varied depending on whether a start offset has been set or not. For example, the fade time may be displayed in white for each channel for which no start offset is set, and may be displayed in green for each channel for which a start offset is set. Particularly, as the number of the channels increases, there may sometimes arise a need to set a fade time and a start offset on separate setting screens. If, in such a case, the display style may be differentiated using letters of different colors and/or the like, then the user can readily identify, at a glance of the fade time setting screen alone, whether a start offset has been set or not.

(4) Further, in the described embodiment, the start offsets and fade times are stored or included in the recall characteristic data 201, 202 and 203 independently of the individual scene data 101, 102 and 103. Alternatively, the start offsets and fade times may be included as parameters in the scene data 101, 102 and 103.

(5) Furthermore, whereas the preferred embodiment has been described in relation to the case where "attenuation lever" is applied as the "signal control parameter", the signal control parameter is not necessarily limited to the attenuation level. For example, any of any other desired parameter, such as "panning" (sound volume balance between left and right channels) or filter characteristic, may also be controlled by setting a start offset and fade time as in the case of the attenuation level.

(6) Furthermore, whereas the preferred embodiment has been described in relation to the case where the basic principles of the present invention are applied to a digital mixer, the present invention may be applied various devices and equipment other than the digital mixer, such as analog mixers and other parameter adjusting devices.

(7) Furthermore, in the above-described embodiment, the parameter variation zone, over which a parameter value is varied automatically in response to a scene recall instruction, comprises a retention section based on the "start offset", and a fade section following the retention section. In an alternative, a retention section for retaining a current value with no variation may be provided in a middle portion of the parameter variation zone; this alternative too can readily achieve non-linear function characteristics.

What is claimed is:

1. A parameter control method for a digital mixer comprising:

a step of storing scene data to be used for automatically varying a parameter, the scene data including a start offset indicative of a time from a recall instruction of the scene data to a start of the variation of the parameter, a target value of the variation of the parameter and a fade time indicative of a time from the start of the variation of the parameter to arrival at the target value;

a step of detecting the recall instruction of the scene data;

a step of counting an elapsed time following the recall instruction of the scene data;

a step of determining whether the start offset agreeing with the elapsed time currently counted by said step of counting is included in the scene data;

a step of starting the variation of the parameter when it has been determined that the start offset agreeing with the elapsed time is included in the scene data; and a step of varying the parameter, the variation of which has been started, on the basis of a variation amount of the target value and the fade time.

2. A parameter control method as claimed in claim 1, further comprising a step of displaying the start offset included in the scene data.

3. A parameter control method as claimed in claim 1 wherein the scene data includes parameters of a plurality of channels, and the scene data includes the fade time and start offset for each of the channels.

4. A parameter control method as claimed in claim 3 further comprising a step of displaying a list of the fade times of individual ones of the channels, and wherein, a style of display is differentiated between the fade time for each channel where the start offset is not set and the fade time for each channel where the start offset is set.

5. A parameter control method as claimed in claim 1 which further comprises:

a step of accepting an event of a predetermined type;

a step of setting a start delay time for delaying a start of processing of the event; and a step of comparing the start delay time and the elapsed time and performing control to start processing of the accepted event on condition that the start delay time has passed following the recall instruction of the scene data.

6. A parameter control method as claimed in claim 5 wherein the processing of the accepted event comprises executing the accepted event or outputting the accepted event to outside.

7. A parameter control method as claimed in claim 1 wherein the digital mixer includes at least one operator member having a knob operable by a human operator and also operable automatically, and wherein said step of varying includes a step of automatically moving the knob of said operator member in accordance with a current value of the parameter varied on the basis of the variation amount.

8. A parameter control method as claimed in claim 1 wherein the digital mixer includes a scene memory storing therein a plurality of sets of said scene data and, in response to the recall instruction of the scene data, one set of scene data to be read out from said scene memory is selected from among the plurality of sets of said scene data, wherein said step of storing scene data stores the plurality of sets of said scene data in said scene memory, wherein said step of detecting the recall instruction of the scene data includes a step of detecting which one of the sets of said scene data has been selected in response to the recall instruction of the scene data and a step of reading out the selected scene data set from said scene memory, and wherein said step of determining whether or not the start offset included in the selected scene data set read out by said step of reading out agrees with the elapsed time currently counted.

9. A parameter selling apparatus for a digital mixer comprising:

a storage section that stores scene data to be used for automatically varying a parameter, the scene data including a start offset indicative of a time from a recall instruction of the scene data to a start of the variation of the parameter, a target value of the variation of the parameter and a fade time indicative of a time from the start of the variation of the parameter to arrival at the target value;

a detection section that detects the recall instruction of the scene data;

a counting section that counts an elapsed time following the recall instruction of the scene data;

a determination section that determines whether the start offset agreeing with the elapsed time currently counted by said counting section is included in the scene data;

a section that starts the variation of the parameter when it has been determined that the start offset agreeing with the elapsed time is included in the scene data; and a section that varies the parameter, the variation of which has been started, on the basis of a variation amount of the target value and the fade time.

* * * * *